July 2, 1957 M. MAYER 2,797,487
ADJUSTABLE CARPENTER SQUARE
Filed July 5, 1955
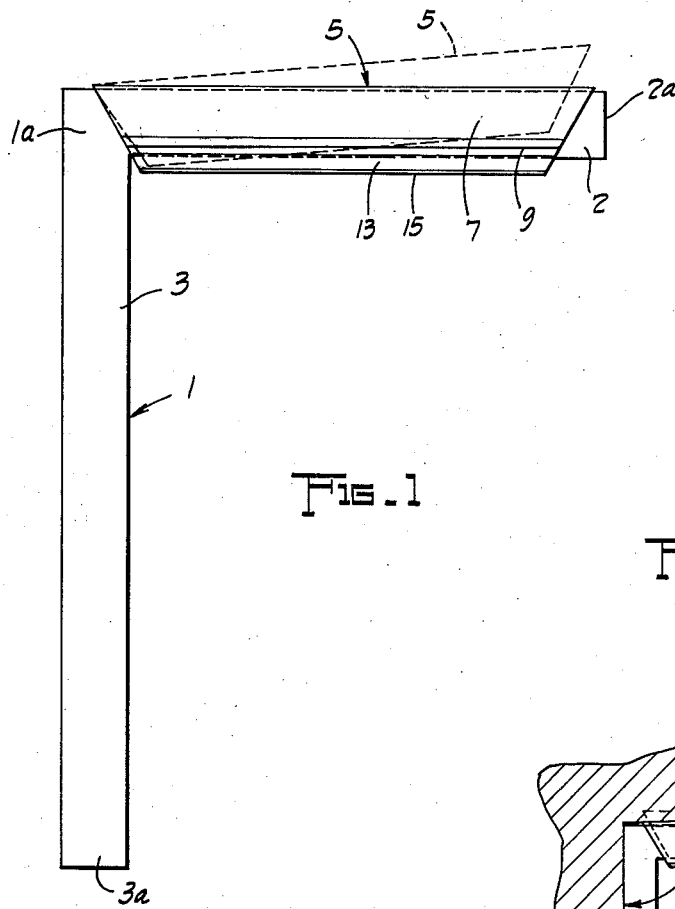
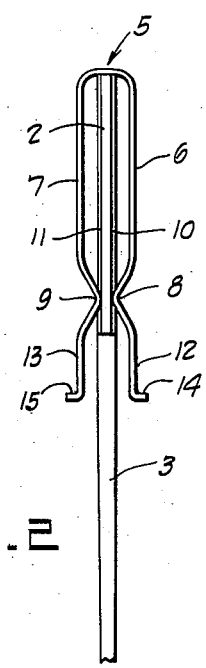
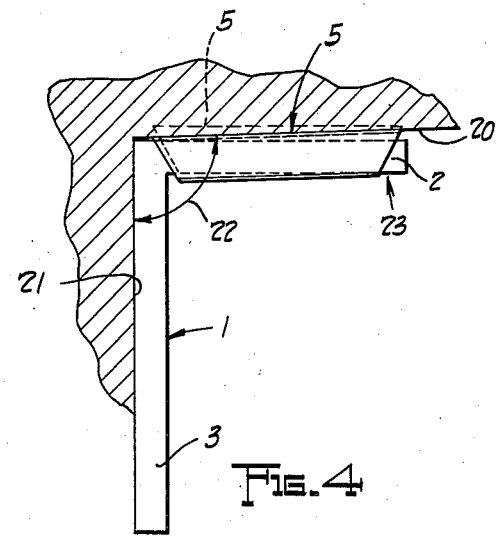
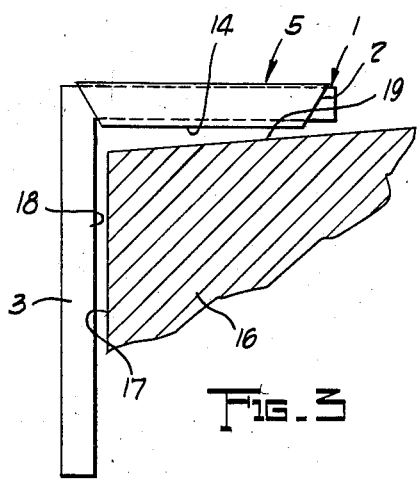
INVENTOR.
MICHAEL MAYER
BY
Robb & Robb
attorneys

United States Patent Office 2,797,487
Patented July 2, 1957

2,797,487

ADJUSTABLE CARPENTER SQUARE

Michael Mayer, Cleveland, Ohio

Application July 5, 1955, Serial No. 519,914

3 Claims. (Cl. 33—112)

This invention relates to carpenters' tools and more specifically to improvements in the very common tool known as a square which may be of the so-called framing type or any other type suitable for use as subsequently set forth.

More particularly the invention resides in the provision of an attachment for a framing square or the like which will be useful in ascertaining angular relationships which are actually either greater, less than, or equal to a right angle.

This would appear to be anomalous since the square is basically intended to be for the purpose of cutting and fitting boards with right angle relationships, but will be seen to be actually a most suitable combination particularly with a framing square, which has many other uses beside the usual right angle layout provision. As a matter of fact this invention makes a framing square more universally useful while in no manner detracting from the more commonly known attributes.

A particular illustration of the increased usefulness of a framing square availing of the invention hereof, is seen to exist when for example it is necessary to fit a board up to a corner, which corner is not precisely a right angle. By simple pressure manipulation of the square with the invention hereof in place, the angle is precisely determined and may be subsequently laid out on a board to enable the end of the board to be properly cut and thereafter positioned in place.

A principal object of the invention therefore, is to provide a carpenters' tool which will be useful as a square but in addition have provision for indicating and making possible the laying out of angles which are not at previsely right angles but in fact are greater or less than 90 degrees.

A further object of the invention is to provide a member which may be attached to any existing framing square and be maintained frictionally on one of the blades thereof, whereby the member may be set to a predetermined angle or in fact be caused to adjust itself thereto by simple manipulation.

Yet another object of the invention is to provide a simple attachment of channel shape which may be mounted on a blade of a framing square or the like and thereafter be manipulated into an infinite number of angular positions with respect to the other blade, whereby to make possible duplication of any angular relationships different from or if desirable equal to 90 degrees.

A further object of the invention is to provide a simple member which may be instantaneously mounted on or removed from a blade of a framing square or the like, which member is positioned frictionally so as to indicate various angular relationships between the edge of the member and the other blade of the square.

Other and further objects of the invention will be understood from a consideration of the specification appended hereto and shown in the drawing wherein Figure 1 is an illustration of a framing square with the attachment hereof in place, the same being on reduced scale illustrating a position of the attachment in dotted line.

Figure 2 is an enlarged end view taken from the right as viewed in Figure 1 illustrating the form of the attachment and certain of the constructional details of a framing square itself.

Figure 3 is an enlarged view partially fragmentary and certain portions being broken away so as to illustrate even more particularly certain phases of the invention hereof.

Figure 4 is a view similar to Figure 1 showing in very exaggerated form the adjusted position of the attachment hereof emplaced on a framing square, all the same being on reduced scale as will be apparent.

Referring now to the drawing, it will be seen initially, referring to Figure 1, that the usual framing square 1 generally indicated is provided, the same comprising a blade 2 which is generally 16 inches long, and integral therewith the blade 3 extending at previsely 90 degrees with respect to the blade 2, the blade 3 being usually 24 inches long. Both of the blades are in common practice substantially wide members in the order of about 2 inches and as seen in Figure 2, the extremities indicated at 2a and 3a of the blade members 2 and 3 are thinner than the juncture of the blades indicated at 1a. This is the usual structure of a framing square known heretofore in the art, and is primarily of course to enable the same to be rigidly constructed and thus maintain the right angle relationship of the respective blades under various conditions which might otherwise cause the same to become misaligned or out of the proper angular relationship.

As is also the usual case in framing squares the faces of the square, and that of course includes and comprises the blades thereof are provided with certain indicia and various tables which are not illustrated at all in this drawing, since they are well known and do not actually take any particular part in the relationships set forth as will be explained with regard to the invention hereof.

Referring now to Figure 2, there is shown as mounted on the blade 2 of the framing square 1, an attachment generally designated 5, comprising a U shaped channel member having the sides 6 and 7 fairly close together and connected in a usual manner at adjacent edges, the said sides 6 and 7 being provided with the longitudinally extending depressed portions or grooves 8 and 9 respectively, which frictionally engage with the opposite faces of the blade member 2 for example indicated at 10 and 11.

Extending beyond and forming a continuation of the sides 6 and 7 are skirt sections 12 and 13, which sections terminate in outwardly extending flanges 14 and 15 respectively. It should be noted that the overall width of the attachment 5 now being described is substantially greater than the width of the blade 2 upon which the said attachment is seated. The reason for this will be understood in considering the description of the use of the square with the attachment in place thereon, which will be set forth hereinafter.

As will be subsequently explained the square 1, with the device 5 seated thereon, may be used in several different ways, in order to fit boards or the like into angular spaces which are not necessarily at right angles, but which may be. Referring therefore to Figure 3, it will be explained that under some circumstances it would be desirable to fit a board having an angle such as is indicated in the fragmentary member, denoted 16, and therefore square 1 with the blade 2 thereon, having seated on the blade the attachment 5, is moved into position shown in Figure 3. One of the sides of the member 16, denoted 17, is in this instance shown as being parallel with the edge 18 of the blade 3, and it will be apparent that the blade 3 may be brought into position so that the portion 17 and edge 18 are in contact. The flange 14 of the member 5, will thereafter be brought into contact with the side 19 of the part 16 and since the attachment 5 is frictionally mounted on the blade 2, suitable pressure applied to the body of the square will cause the attachment 5 to assume an angular position which may be more clearly shown by dotted lines for example in Figure 1 though such lines are somewhat out of actual position. It will be obvious that the device 5 is thereby positioned and will maintain its position in engagement with the blade 2 so that subsequently by suitably positioning the combination on a board, the edge or end of the board could be cut so as to form the angle provided by the edges 17 and 19 of the part 16. Clearly the board thereafter would fit so as to have portions coinciding with the edges as explained.

Figure 4 shows a different condition to be met by the device hereof wherein it will be assumed that a part which is designated 20 and may be a wall in a corner of a room, for example, forms an angle with another wall 21 which angle is noted 22 and which is obviously not a right angle.

By positioning the device 5 in the dotted line position of Figure 4, it being obvious that the square 1 with the device thereon is previously spaced somewhat from the corner, in other words, farther away from the corner with the edge of the blade 3 in contact with the wall 21, subsequent movement in the direction of the arrow 23 will cause the attachment 5 to assume the solid line position, the members 8 and 9 gripping the opposite sides, 10 and 11, of the blade 2. This gripping action will frictionally position the device 5 therein as will be apparent, and subsequently by suitable alignment of the square on a board or the like, the end of the board may be cut so as to fit in contact with both the wall 20 and the wall 21 previously mentioned.

In view of the foregoing it will be apparent that two quite different uses of the member 5 may be resorted to, which in conjunction with the framing square shown on the drawings, will enable fitting boards into positions not normally possible with a framing square. It is further apparent that the device 5 may be removed and the framing square be thereafter used for measuring or establishing of right angles. It should also be understood that it is not necessary to remove the device or attachment 5 from the framing square in order to use the same for right angle indication, since the device will not interfere with such indication, under any conditions and where some angular differences do exist may be availed of to lay out the same.

It will therefore be apparent that angular differences of considerable extent may be established by the use of the framing square and attachment of this invention and a useful device of considerable flexibility is made possible by availing of the concept hereof.

While the attachment hereof has been described in conjunction with a square, whether of the framing or other type, it will be understood that a single blade member, such as a straight edge may be used. In this instance the attachment will be formed in precisely the same manner and grip the opposite faces of such straight edge. Such an arrangement would be quite useful in laying out very acute angles as will be readily understood.

I claim:

1. In combination with a framing square of the class described, including relatively wide flat blade sections extending at right angles, an attachment comprising an elongated generally U-shaped body formed so as to substantially surround and be co-extensive with one blade section, gripping means extending along the body to engage the section aforesaid and frictionally locate said body on said section in a plurality of positions, said body having one edge arranged to cooperate with an edge of another blade section, to provide indication of an angle greater, less than, or equal to 90 degrees.

2. The combination as claimed in claim 1, wherein the body is of greater width than the blade section on which it is seated, said body thereby having one edge at least extending outwardly from the adjacent edge of the section and arranged to cooperate with an edge of the other blade section to provide the angular relationship indication set forth.

3. The combination as claimed in claim 1, wherein the U-shaped body includes connected oppositely disposed portions extending closely substantially parallel with opposite faces of the blade section on which the device is seated, at least one of said portions being of greater width than said section, and the gripping means extend inwardly from such portions into contact with corresponding surfaces of the section.

References Cited in the file of this patent

UNITED STATES PATENTS

| | | |
|---|---|---|
| 189,737 | Hopkins | Apr. 17, 1877 |
| 376,341 | Panyard | Jan. 10, 1888 |
| 410,050 | Varley | Aug. 27, 1889 |
| 818,958 | Hause et al. | Apr. 24, 1906 |